No. 883,289. PATENTED MAR. 31, 1908.
B. R. BURG.
FUNNEL.
APPLICATION FILED MAR. 7, 1907.
2 SHEETS—SHEET 1.
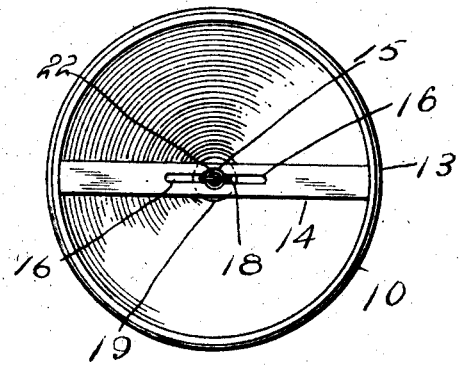
Fig. 1.
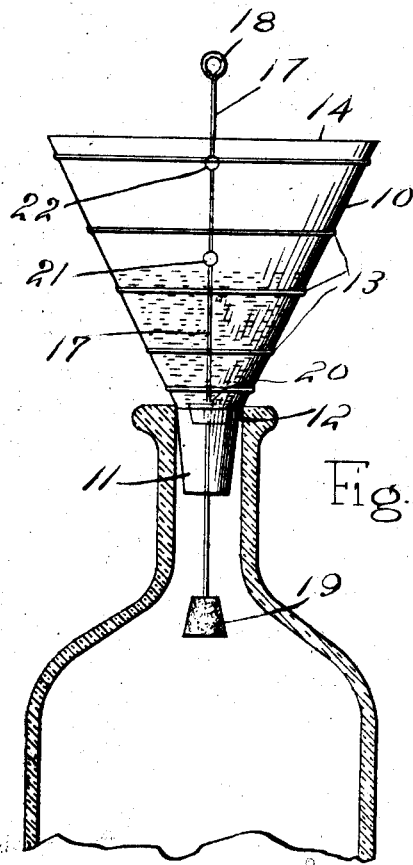
Fig. 2.
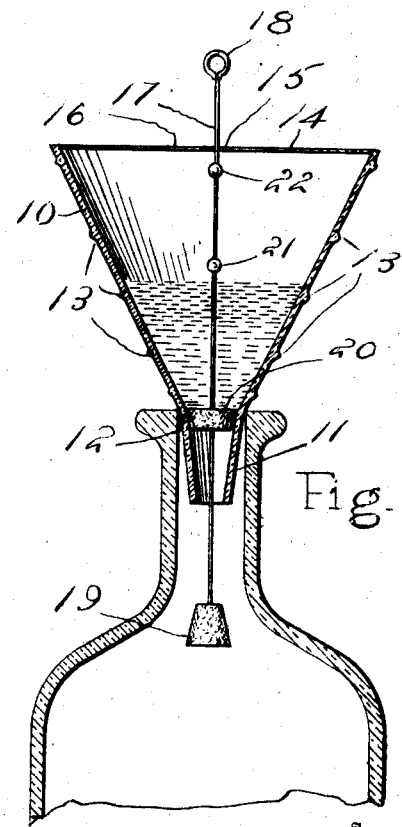
Fig. 3.
Witnesses
J. C. Simpson
M. T. Miller
Inventor
Bertha R. Burg.
By 
Attorneys No. 883,289. PATENTED MAR. 31, 1908.
B. R. BURG.
FUNNEL.
APPLICATION FILED MAR. 7, 1907.
2 SHEETS—SHEET 2.
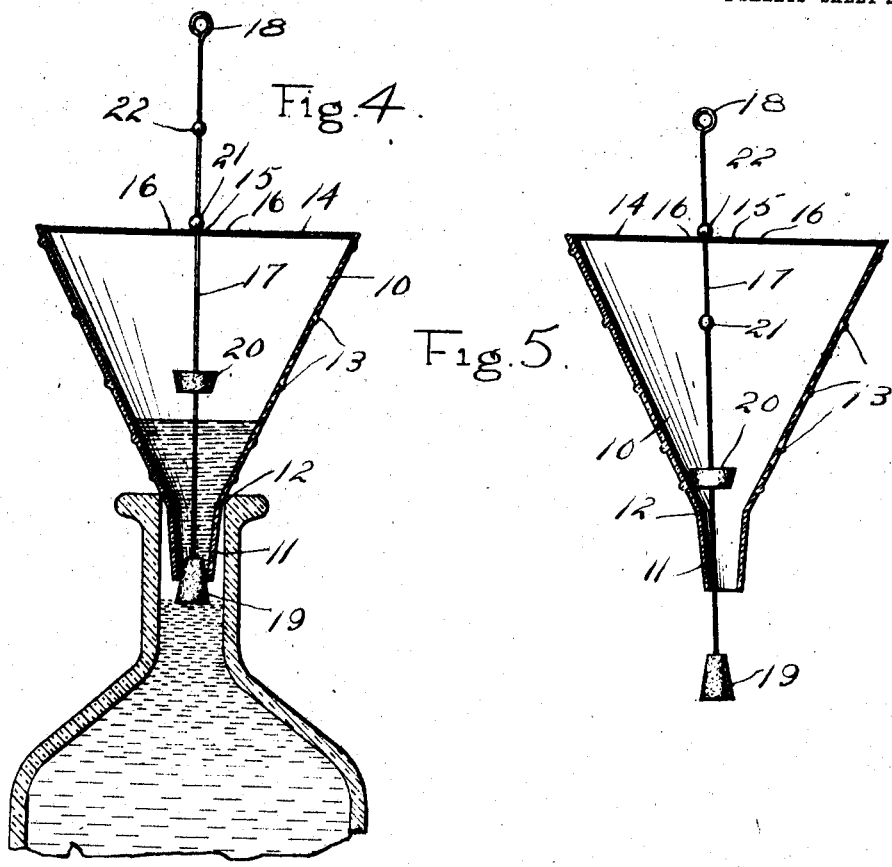
Inventor
Bertha R. Burg.
Witnesses
J. C. Simpson
M. F. Miller
By
Attorneys

UNITED STATES PATENT OFFICE.

BERTHA R. BURG, OF PANA, KANSAS.

FUNNEL.

No. 883,289.

Specification of Letters Patent.

Patented March 31, 1908.

Application filed March 7, 1907. Serial No. 361,140.

*To all whom it may concern:*

Be it known that I, BERTHA R. BURG, a citizen of United States, residing at Pana, in the county of Stanton, State of Kansas, have invented certain new and useful Improvements in Funnels; and I do hereby declare the following to be a full, clear, and exact description of the invention, such as will enable others skilled in the art to which it appertains to make and use the same.

This invention has relation to measuring and automatically-operated funnels.

It is the object of the invention to provide a funnel scribed with a scale and having a stopple operated from the top to enable the funnel to have a particular quantity of liquid poured and held therein to be transferred to a bottle or other vessel.

It is a further object of the invention to provide a measuring funnel with means for stoppling the funnel when a bottle or other vessel being filled therethrough becomes full, and to hold the stopple in the spout after the filling of the bottle.

Other objects of the invention incidental to the foregoing will appear obvious from the general description thereof hereinafter given.

The nature of the invention is to be ascertained from the device portrayed in the annexed drawings, forming a part of this specification, in view of which it will first be described in detail with respect to its construction and manner of use, and then be pointed out in the subjoined claims.

Of the said drawings—Figure 1 is a plan of the improved funnel. Fig. 2 is a side view showing the funnel as arranged for pouring a particular measurement of liquid held therein into a bottle or other vessel. Fig. 3 is a vertical sectional view of Fig. 2. Fig. 4 is a vertical sectional view of the parts showing the bottle as filled and representing the co-operating parts of the funnel as accordingly positioned. Fig. 5 is a sectional view showing the closures for the spout as held up, and the latter as open.

Similar numerals of reference designate similar parts or features, as the case may be, wherever they occur.

In the drawings, having reference specially to Figs. 1–4, 10 designates the body of the funnel which may be composed of glass or other transparent substance and provided with a spout 11 of usual form, which spout may be composed of the same material as the body 10 or of a different material and be connected with the bottom of the body, as at 12. Peripheral beads 13 are formed on the funnel proper to indicate the amount of liquid therein.

Across the top of the funnel there is arranged a bar, 14, provided centrally with a round or enlarged opening, 15, having narrow slots 16 at its sides, in line with the bar. Through the opening 15, and extending down through the spout 11, is a wire, 17, provided on its upper end with a loop, 18, by which it may be manipulated, a stopple, 19, being secured to its lower end.

Within the body of the funnel on the rod 17 there is a second stopple, 20, and above the said stopple 20 at spaced intervals there are balls or oval shaped pieces of wood or similar substance, 21 and 22. The balls 21 and 22 are of sufficiently small diameter to enable them to pass, when the rod 17 is raised, through the opening 15 in the cross bar 14, but of such size as to prevent them from passing through the slots 16 at the sides of said opening 15.

Excepting the wire and the balls and stopple carried thereby, the interior of the body of the funnel is free from all obstructions or means of any kind to get out of order or to become foul, or that may deleteriously affect the liquid passed therethrough. The stopples and balls are directly connected with and controlled by the wire.

In the use of the invention, supposing a certain amount of liquid, either in ounces, pints, quarts or gallons, is to be filled into a bottle or other vessel, the rod 17 will be lowered so as to cause the stopple 20 to close the funnel at the top of the spout 11 as shown in Figs. 2 and 3, when the liquid will be poured into the funnel in the amount desired. The said amount will be indicated by the scale scribed thereon, and with the funnel thus filled, the liquid therein may be transferred to a bottle, placing the spout of the funnel in the neck of the said bottle and lifting the wire 17 until the ball 22 passes through the opening 15 when by moving the said wire to one side, the ball will be maintained on top of the bar 14 and hold the spout open, as shown in Fig. 5.

After all of the liquid in the funnel shall have run out, the spout may be closed again by lowering the stopple 20 and the funnel be placed in condition to be used as before stated.

If the liquid contained in the funnel should happen to be more than the bottle or other vessel can hold the stopple 19, which as indicated, is formed as a float will rise with the liquid in the bottom of the spout, thus closing it against further discharge of liquid from the funnel into the bottle.

The rising of the stopple 19, as just described, will raise the wire and pass the balls 21 and 22 through the opening 15 when the wire may be moved to one side, carrying it into one of the slots 16 and holding the funnel closed by the stopple 19, as before stated, so that there will be no overflow of liquid from the bottle, as is indicated in Fig. 4.

It is to be observed that the rod can be easily taken out of the funnel so as to renew the stopples or repair them in cases of necessity.

It is to be also observed that the funnel is simple in construction so that it may be used as an ordinary funnel without taking measurement of the contents poured therethrough and it may also be employed for measuring liquids and pouring them out from the top of the funnel without letting them pass through the spout if so desired.

When the bottle becomes filled the stopple 19 operating as a float, will rise, stoppling the spout and raising the ball 22 above the bar 14, where it may be locked in position as described, confining the surplus liquid in the funnel, until the spout is reopened as before stated.

What is claimed is—

1. A funnel having the body thereof composed of glass scribed with a scale indicating its contents, a rod extending from above the top of the funnel through its spout and provided on the lower end with a floating stopple and with a second stopple inside the funnel above the spout directly connected with and controlled by the wire, a bar extended across the top of the funnel provided with a central opening having narrow slots at each side of the opening, and balls on the rod in spaced relation above the stopple inside the funnel.

2. A funnel provided with a bar across its top having a relatively large opening in its center and narrow slots at the sides thereof, a wire extended through said opening and through the spout and provided with a float stopper below the spout, and a ball on the wire within the funnel adapted to pass through the central opening in the bar when the wire is raised by the float stopple the wire being adapted to be passed into the slots in the cross-bar at the sides of the opening therein by merely being moved lateraly therein.

In testimony whereof, I affix my signature, in presence of two witnessess.

BERTHA R. BURG.

Witnesses:
PERMINTANA COMBS,
ROSE WEBER.